US012547291B2

(12) United States Patent
Roloff et al.

(10) Patent No.: US 12,547,291 B2
(45) Date of Patent: *Feb. 10, 2026

(54) TREE FROG COMPUTER NAVIGATION SYSTEM FOR THE HIERARCHICAL VISUALIZATION OF DATA

(71) Applicant: Integer Health Technologies, LLC, Arlington, TX (US)

(72) Inventors: Scott Roloff, Arlington, TX (US); William McCallum, Fort Worth, TX (US); Ken Grifno, The Colony, TX (US)

(73) Assignee: Integer Health Technologies, LLC, Arlington, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,955

(22) Filed: Nov. 2, 2023

(65) Prior Publication Data
US 2024/0069686 A1 Feb. 29, 2024

Related U.S. Application Data

(63) Continuation of application No. 15/950,681, filed on Apr. 11, 2018, now Pat. No. 11,809,676.

(Continued)

(51) Int. Cl.
*G06F 3/04812* (2022.01)
*G06F 3/04817* (2022.01)
*G06F 16/901* (2019.01)

(52) U.S. Cl.
CPC ...... *G06F 3/04812* (2013.01); *G06F 3/04817* (2013.01); *G06F 16/9027* (2019.01)

(58) Field of Classification Search
CPC ............. G06F 3/04812; G06F 3/04817; G06F 16/9027

(Continued)

(56) References Cited

U.S. PATENT DOCUMENTS 8,185,824 B1 * 5/2012 Mitchell ............... G06F 3/0481
715/734
2013/0135314 A1 * 5/2013 Haggerty ............... G06T 11/20
345/440

OTHER PUBLICATIONS

K. L. Kroeker, "Seeing data: new methods for understanding information," in IEEE Computer Graphics and Applications, vol. 24, No. 3, pp. 6-12, May-Jun. 2004, doi: 10.1109/MCG.2004.1297004. (Year: 2004).*

(Continued)

*Primary Examiner* — Kieu D Vu
*Assistant Examiner* — Nicholas Hasty
(74) *Attorney, Agent, or Firm* — Vincent J. Allen; James H. Ortega; Carstens, Allen & Gourley, LLP

(57) ABSTRACT

A computer navigation system that represents categories and sub-categories of material with functionally labeled objects connected in a hierarchical organization. Descending nodes represent more detailed subsets of material. Hovering the computer mouse over a node displays thumbnails of the items available under it, enabling the user to search for items without opening the respective pages, transforming a literal or verbal data filing and retrieval process into a more intuitive and easy to use visual one. Once the user hovers the computer mouse over the node with the desired item and sees its thumbnail the user clicks on the node, opening the screen from which the user can access that item (or upload a similar one), or clicks on the thumbnail to access the item directly. In addition, the system employs algorithms to group items into various categories and sub-categories and assigns them to the appropriate nodes.

18 Claims, 4 Drawing Sheets

Related U.S. Application Data

(60) Provisional application No. 62/486,145, filed on Apr. 17, 2017.

(58) Field of Classification Search
USPC .......................................................... 715/838
See application file for complete search history.

(56) References Cited

OTHER PUBLICATIONS

Dachselt, Ralmund, et al. "Collapsible Cylindrical Trees: A Fast Hierarchical Navigation Techinque" IEEE Symposium on Information Visualization 2001 (INFOVIS'01) (Year: 2001).

Hlawatsch, Marcel, et al. "Bubble Hierarchies" CAe 2014, p. 77-80 (Year: 2014).

\* cited by examiner

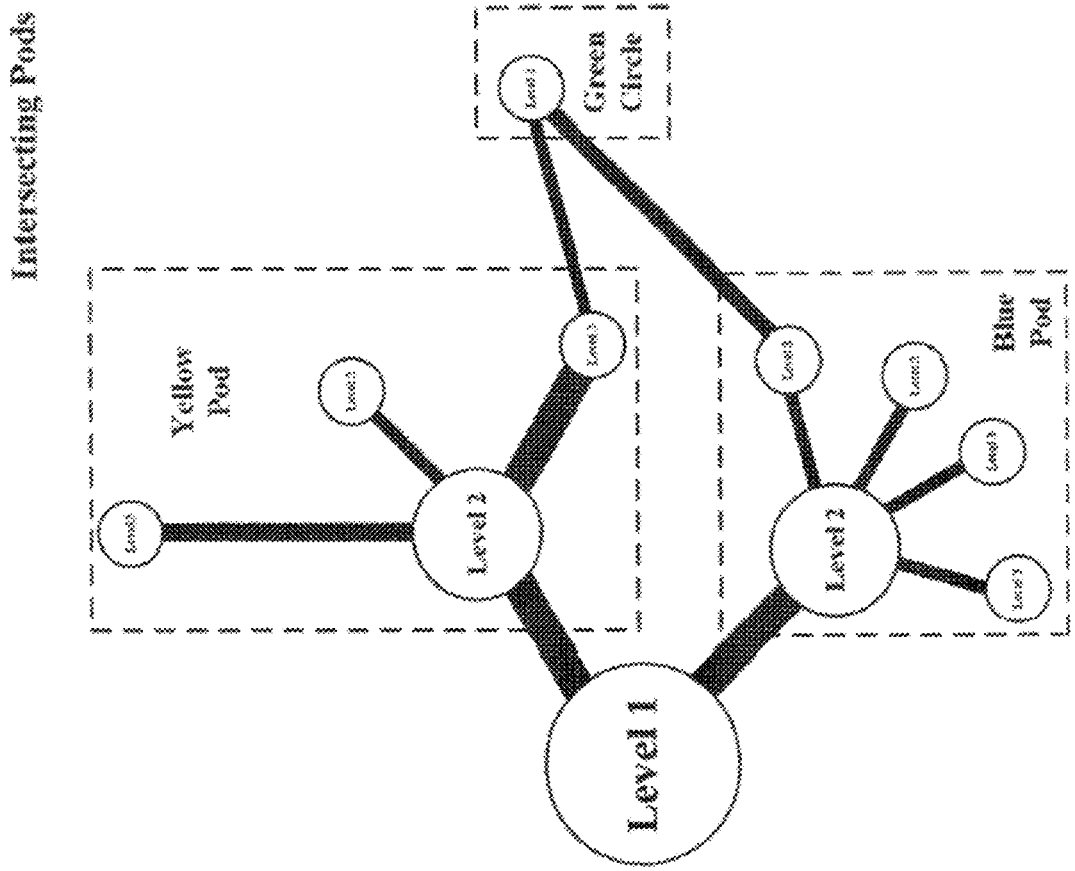

*Data sets from different pods may intersect with the length and width of the linking stems indicating the connectedness of the data underlying the intersecting circle to the data underlying each pod and its linking circle; when pods are color coded the circle for the resulting intersecting data set can take the resulting color of the combining sets (e.g., the intersection of the yellow and blue pods yields a green circle)*

Figure 2

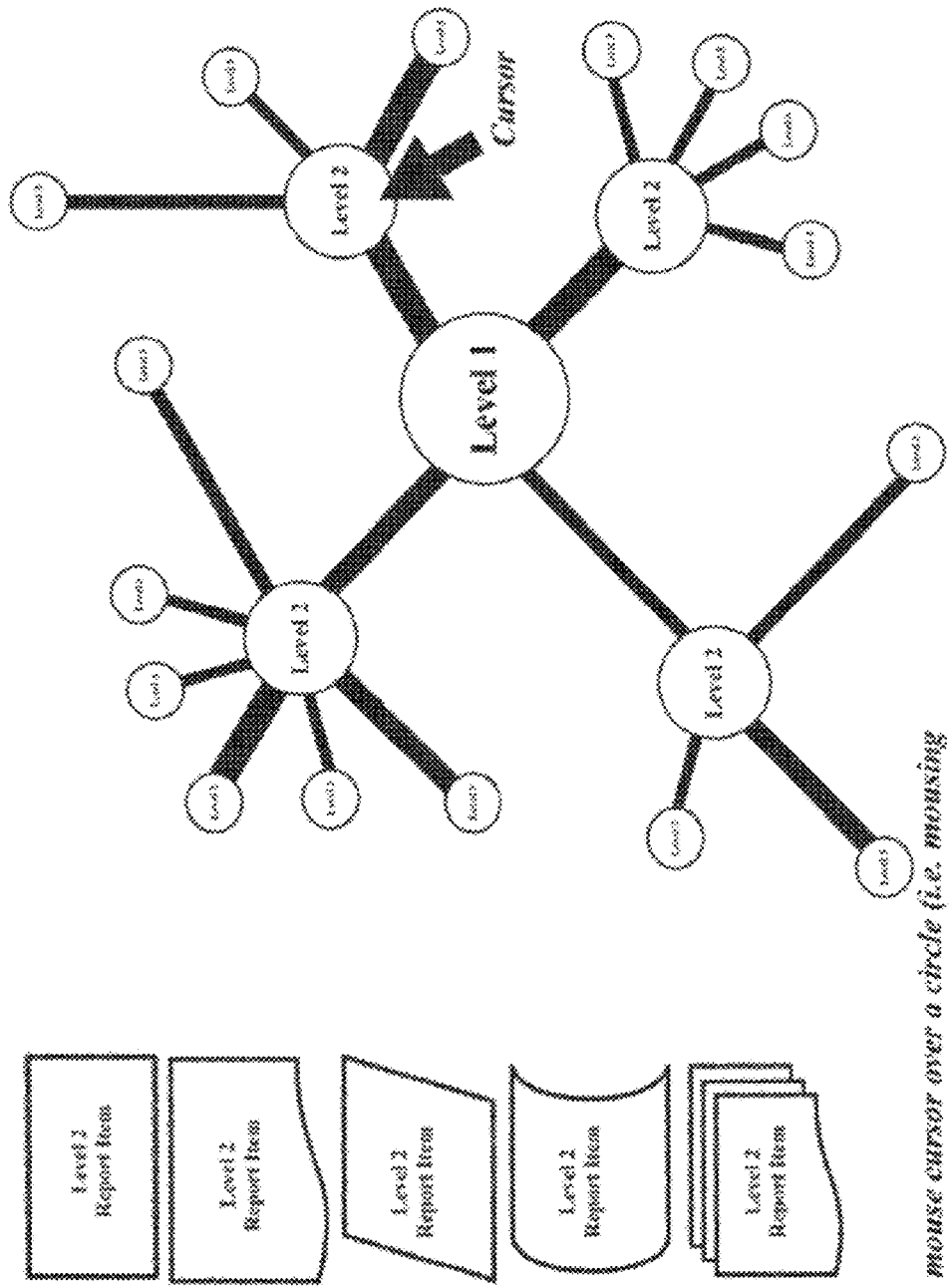

TREE FROG COMPUTER NAVIGATION SYSTEM FOR THE HIERARCHICAL VISUALIZATION OF DATA

CROSS REFERENCE TO RELATED APPLICATION

This application is a continuation of U.S. patent application Ser. No. 15/950,681, filed Apr. 11, 2018, now U.S. Pat. No. 11,809,676, which claims the benefit of U.S. Provisional Patent Application No. 62/486,145, filed Apr. 17, 2017, entitled "Artificial Intelligence System Predicting Qualitative Information of Reported Data with Numerical and Color Coding Enabling Improved Data Visualization," and such application is incorporated by reference herein in its entirety.

TECHNICAL FIELD

The present disclosure is a computer navigation system for an individual (i.e. a user) using a computer along with a computer monitor and computer mouse. The navigation system employs the novel approach of representing categories and sub-categories of material with connected circles in a hierarchical organization on a single computer screen, with the length and width of the stems linking the circles indicating the connectedness of the underlying data sets. The system includes algorithms that organizes the items in such categories and sub-categories and determine the length and width of the stems. Descending circles in the hierarchy represent more detailed subsets of the material. Hovering the computer mouse over a circle (i.e. mousing over) displays thumbnails of the items available under it, transforming a literal or verbal data filing and retrieval process into a more intuitive and easier to use visual one.

BACKGROUND

When using a computer, large quantities of data (e.g. contracts, dashboards, documents, reports, etc.) are difficult for the user to comprehend. Organizing the data to display on a computer screen using language or simple icons alone can be confusing and over-whelming.

Generally, a user searches for a desired item by continuously opening and closing screens until the user finds what he or she is looking for-draining the computer and network's resources while wasting time.

There is a need for a system that will permit a user to navigate the items on a computer or network quickly and effectively.

SUMMARY

Disclosed herein is a computer navigation system that represents categories and sub-categories of material with functionally labeled circles connected in a hierarchical organization. The circles are linked by stems, with the length and width of the stem indicating the connectedness of the underlying data sets. Descending circles in the hierarchy represent more detailed subsets of the material. The invention is described using the words "tree frog" because a larger circle connected to smaller circles resembles the footprint of a tree frog on a windowpane.

Mousing over a circle displays thumbnails of the items available under it, enabling the user to search for items without opening the respective pages and viewing the actual items, transforming a literal or verbal data filing and retrieval process into a more intuitive and easier to use visual one. Once the user mouses over the circle with the desired item and sees its thumbnail the user clicks on the circle, opening the screen from which the user can access that item (or upload a similar item), or clicks on the thumbnail to access the item directly.

To the extent that data has not been previously designated to appear at specific circles by the computer user or network administrator, the system employs algorithms to group those items into various categories and sub-categories, first by function or sub-function and then by granularity, both on a contextual and numeric basis. For example, algorithms identifying certain key words or data sets may group together all human resource records at one level, and then subdivide the payroll reports into one sub-level and the time reports into another. Similarly, the algorithms determine the length and width of the stems linking the circles based on the connectedness of the underlying data sets.

This navigation system transforms the literal display of data into a visual one on a single computer screen and improves computer and network performance by decreasing the resources used to open and close screens while searching for the right one, while increasing the effectiveness and speed of the user's search and/or filing process.

BRIEF DESCRIPTION OF THE DRAWINGS

A complete understanding of the present disclosure may be obtained by reference to the accompanying drawings in conjunction with the following detailed description.

FIG. 2 depicts two pods (a pod being a higher level circle with the smaller circles branching out from it, e.g. a Level 2 circle and its linked Level 3 circles) intersecting to create a new data set linked to both.

FIG. 3 depicts the computer navigation system displaying thumbnails of the items (contracts, dashboards, documents, reports, etc.) under a category level when the computer's curser mouses over the respective circle.

DETAILED DESCRIPTION

Various objects, features, aspects and advantages will become more apparent from the following detailed description along with the accompanying drawings. The principles are described with specificity; however, the description and drawings are not intended to limit the scope of the principles disclosed herein. Rather, the principles might also be embodied in other ways and include different steps or combinations of steps similar to the ones described herein.

Disclosed herein is a computer navigation system for an individual (i.e. a user) using a computer along with a computer monitor and computer mouse. The navigation system employs the novel approach of representing categories and sub-categories of material with functionally labeled circles that are connected in a hierarchical organization on a single computer screen with the length and width of the stems linking the circles indicating the connectedness of the underlying data sets. Descending circles in the hierarchy represent more detailed subsets of the material. The invention is described using the words "tree frog" because a larger circle connected to smaller circles resembles the footprint of a tree frog on a windowpane.

Figure 1:
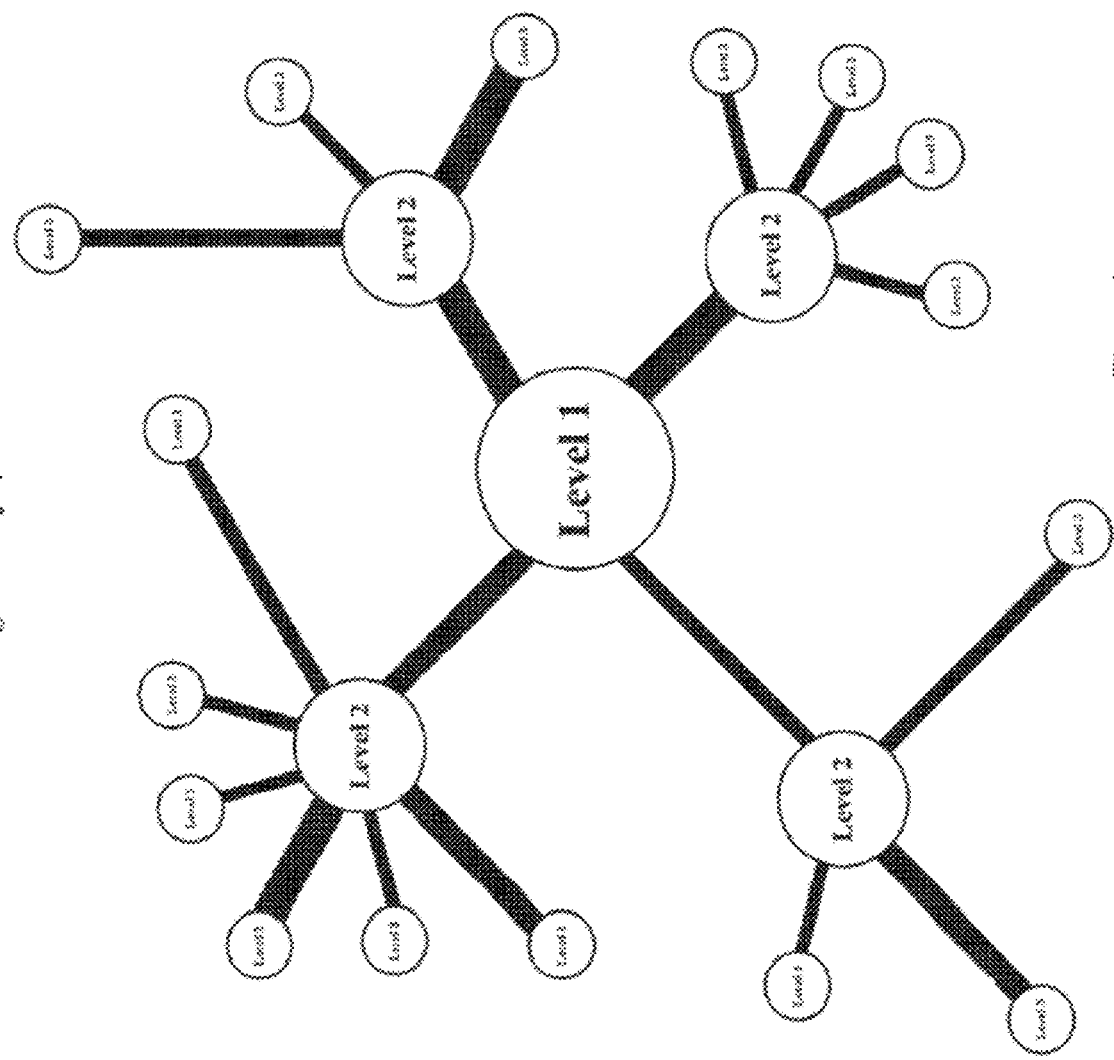
FIG. 1 depicts the computer navigation system employing ever smaller connected circles to represent the categories and sub-categories of material along with the varying lengths and widths of the stems linking the circles indicating the connectedness of the underlying data sets.

FIG. 1 depicts the computer navigation system employing ever smaller connected circles to represent the categories and sub-categories of material, with varying lengths and widths of stems indicating the connectedness of the underlying data sets. Level 1 is the overall or umbrella category, which may contain high level dashboards, reports and other items. Level 2 circles are sub-categories of Level 1. For example, in a human resource setting this level could include sub-categories for personnel, payroll, and employee benefits. Level 3 are further sub-categories of the respective Level 2 circle. For example, the Level 3 circles under employee benefits could include health insurance, life insurance and wellness programs. FIG. 1 only depicts three levels, although the system can produce as many levels as desired.

With respect to the stems, the length of the stem may indicate one coefficient of connectedness between the data sets underlying the linked circles, while the width of the stem another.

To enhance visualization of different pods (i.e. a Level 2 circle and then the Level 3 circles branching out from it), each pod can be a different color.

The data sets underlying different pods may intersect. For example, if one pod categorized employee benefits information and another pod factory operational data, the circle for employee hospital medical claims in the employee benefits pod might intersect with the employee time and attendance circle in the factory operational data pod to report the anomaly of employee shown as being in the hospital in one data set while at the same time being shown at work in the factory under another.

FIG. 2 depicts such an intersection. When pods are color coded, the circle for the resulting inter-connected data set can take the resulting color of the combining sets. If the employee benefits pod was yellow, and the factory operational data pod was blue, the intersecting circle for employees shown in the hospital and at work at the same time could be green (Yellow+Blue=Green).

Hovering the computer mouse over a circle (i.e. mousing over) displays thumbnails of the items available under it, enabling the user to search for items without opening the respective pages and viewing the actual items, transforming a literal or verbal data filing and retrieval process into a more intuitive and easier to use visual one.

FIG. 3 depicts the computer navigation system displaying thumbnails of the items (contracts, dashboards, documents, reports, etc.) under a category level when the computer's cursor mouses over the respective circle.

Once the user mouses over the circle with the desired item and sees its thumbnail the user clicks on the circle, opening the screen from which the user can access that item (or upload a similar item). Alternatively, the user can click on the thumbnail to access the item directly.

In addition to stream-lining the search and retrieval process, to the extent that data has not been previously designated to appear at specific circles by the computer user or network administrator, the system employs algorithms to group items into various categories and sub-categories, first by function or sub-function and then by granularity, both on a contextual and numeric basis while determining the appropriate lengths and widths of the stems linking the circles to show the connectedness of the underlying data based on selected coefficients. For example, algorithms identifying certain key words or data sets may group together all human resource records at one level, and then subdivide the payroll reports into one sub-level and the employee benefits reports into another.

Figure 4:
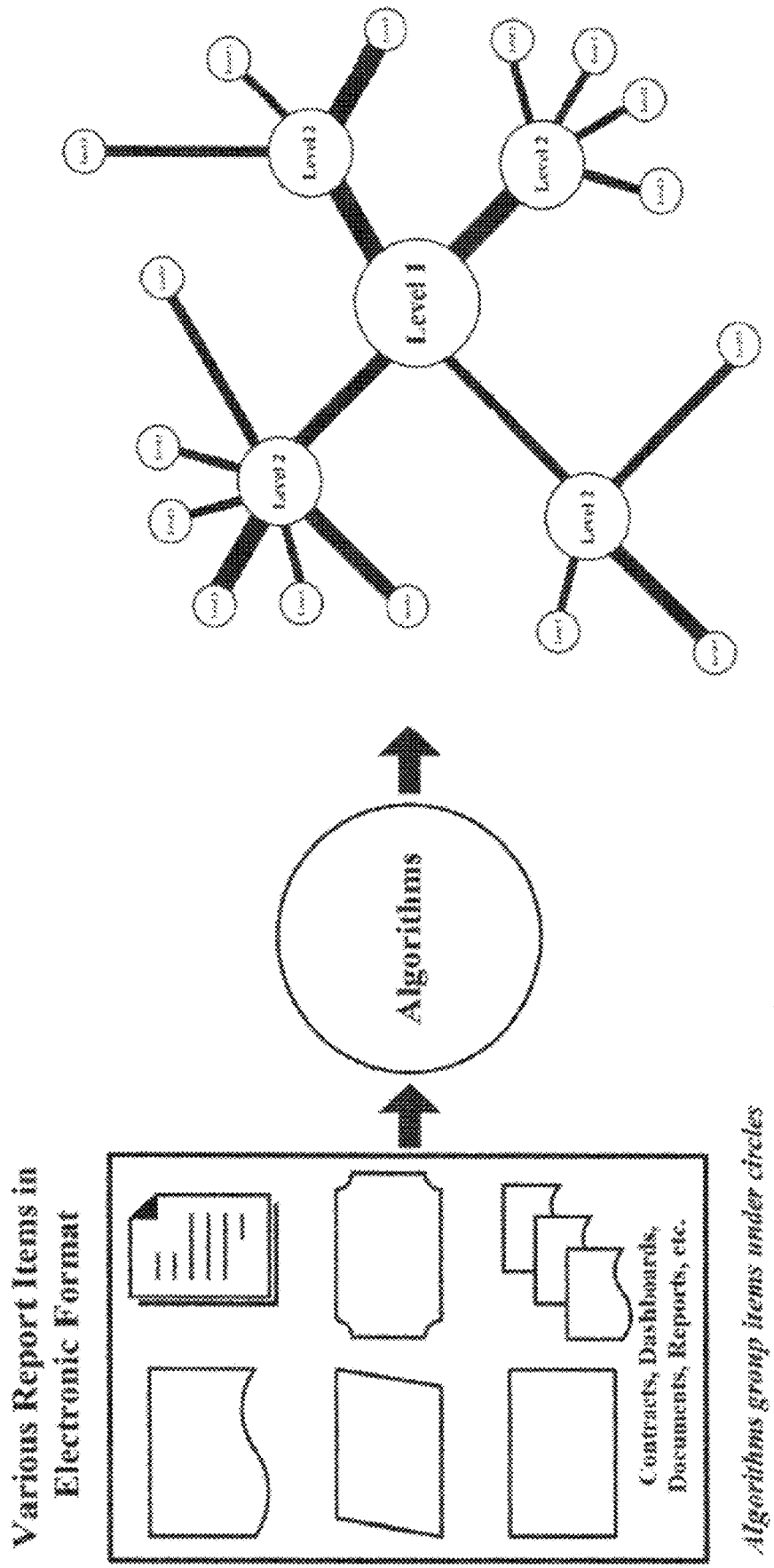
FIG. 4 depicts the algorithms sifting through items and grouping them into categories and sub-categories, and then assigning them to the appropriate circles with the length and width of the linking stem indicating the connectedness of the underlying data sets.

FIG. 4 depicts the system's algorithms sifting through items and grouping them by subject matter, and then assigning them to the appropriate level of granularity for display within a pod, while connecting the pod's circles with stems of the appropriate length and width based on the connectedness of the underlying data.

The system transforms the literal display of data into a visual one on a single computer screen and improves computer and network performance by decreasing the resources used to open and close screens while searching for the right one, while increasing the effectiveness and speed of the user's search and/or filing process.

This detailed description is not intended to be limiting or represent an exhaustive enumeration of the principles disclosed herein. It will be apparent to those of skill in the art that numerous charges may be made in such details without departing from the spirit of the principles disclosed herein.

What is claimed is:

1. A method of presenting visual navigation on a single computer screen for a user using a computer along with a computer mouse to perform a search, the method comprising:

displaying, using the computer, to the user in a navigational interface a representation of groups of items within functionally labeled circles connected in a hierarchical order;

providing organization of the hierarchical order using a central circle branching off into several smaller second circles, and from each of the several smaller second circles branching off into several even smaller third circles, with each circle and the several smaller circles branching out from said each circle forming a pod;

presenting, in the navigational interface, more detailed subsets of information regarding the items as the circles branch off and hierarchically descend in size, wherein the central circle represents a category of data and the second circles each represent a sub-category of data of the category of data of the central circle, and wherein the third circles each represent a sub-category of data of each respective sub-category of data of the second circles each third circle is connected to;

linking, using the computer, the circles with stems, wherein lengths and widths of the stems indicating the connectedness of underlying data representing the items in respective circles based on selected coefficients, wherein length of a stem indicates connectedness with respect to a first coefficient and width of that stem indicates connectedness with respect to a second coefficient different than the first coefficient of two linked circles, wherein the first and second coefficients representing the data of the central circle differ from the first and second coefficients representing the data of one or more second circles, and wherein the first and second coefficients representing the data of the one or more second circles differ from the first and second coefficients representing the data of one or more third circles, and so on;

displaying, in the navigational interface, thumbnails of the item(s) represented by a circle when the user hovers a computer cursor controlled by the computer mouse over said circle; and opening, using the computer, a screen from which the user can access an item(s) or upload similar items when the user selects said item(s) in the navigational interface using the computer mouse.

2. The method of claim 1, the method further comprising: wherein the user selects said item(s) by selecting the circle(s) corresponding to each said item(s).

3. The method of claim 1, the method further comprising: wherein the user selects said item(s) by selecting the thumbnail corresponding to each said item(s).

4. The method of claim 1, the method further comprising: employing algorithms to group items into various respective categories and sub-categories, first by function or sub-function and then by granularity, both on a contextual and numeric basis; and
assigning each such grouped item(s) to a corresponding circle.

5. The method of claim 1, the method further comprising: linking each corresponding circle with a stem of an appropriate length and width to indicate the connectedness of the underlying data set(s) representing said grouped item(s).

6. The method of claim 1, wherein each pod is displayed in a corresponding color.

7. The method of claim 6, the method further comprising: intersecting a circle under one pod with a circle under another pod to create a new circle when the underlying data of the one pod and the another pod is related to both said pods.

8. The method of claim 6, wherein each pod is displayed in one or more colors different from the one or more colors of another pod.

9. The method of claim 8, the method further comprising: assigning, using the computer, a color to the new circle by combining the colors of the intersecting pods when each pod is displayed in a corresponding color.

10. A non-transitory computer-readable medium having computer executable code for presenting visual navigation on a single computer screen for a user using a computer along with a computer mouse to perform a search, wherein said code when executed by one or more processors performs the process of:
displaying, using the computer, to the user in a navigational interface a representation of groups of items within functionally labeled circles connected in a hierarchical order;
providing organization of the hierarchical order using a central circle branching off into several smaller second circles, and from each of the several smaller second circles branching off into several even smaller third circles, with each circle and the several smaller circles branching out from said each circle forming a pod;
presenting, in the navigational interface, more detailed subsets of information regarding the items as the circles branch off and hierarchically descend in size, wherein the central circle represents a category of data and the second circles each represent a sub-category of data of the category of data of the central circle, and wherein the third circles each represent a sub-category of data of each respective sub-category of data of the second circles each third circle is connected to;
linking, using the computer, the circles with stems, wherein lengths and widths of the stems indicating the connectedness of underlying data representing the items in respective circles based on selected coefficients, wherein length of a stem indicates connectedness with respect to a first coefficient and width of that stem indicates connectedness with respect to a second coefficient different than the first coefficient of two linked circles, wherein the first and second coefficients representing the data of the central circle differ from the first and second coefficients representing the data of one or more second circles, and wherein the first and second coefficients representing the data of the one or more second circles differ from the first and second coefficients representing the data of one or more third circles;
displaying, in the navigational interface, thumbnails of the item(s) represented by a circle when the user hovers a computer cursor controlled by the computer mouse over said circle; and
opening, using the computer, a screen from which the user can access an item(s) or upload similar items when the user selects said item(s) in the navigational interface using the computer mouse.

11. The non-transitory computer-readable medium of claim 10, wherein the process performed further comprises: wherein the user selects said item(s) by selecting the circle(s) corresponding to each said item(s).

12. The non-transitory computer-readable medium of claim 10, wherein the process performed further comprises: wherein the user selects said item(s) by selecting the thumbnail corresponding to each said item(s).

13. The non-transitory computer-readable medium of claim 10, wherein the process performed further comprises: employing algorithms to group items into various respective categories and sub-categories, first by function or sub-function and then by granularity, both on a contextual and numeric basis; and
assigning each such grouped item(s) to a corresponding circle.

14. The non-transitory computer-readable medium of claim 10, wherein the process performed further comprises: linking each corresponding circle with a stem of an appropriate length and width to indicate the connectedness of the underlying data set(s) representing said grouped item(s).

15. The non-transitory computer-readable medium of claim 10, wherein each pod is displayed in a corresponding color.

16. The non-transitory computer-readable medium of claim 15, wherein the process performed further comprises: intersecting a circle under one pod with a circle under another pod to create a new circle when the underlying data of the one pod and the another pod is related to both said pods.

17. The non-transitory computer-readable medium of claim 15, wherein each pod is displayed in one or more colors different from the one or more colors of another pod.

18. The non-transitory computer-readable medium of claim 17, wherein the process performed further comprises: assigning, using the computer, a color to the new circle by combining the colors of the intersecting pods when each pod is displayed in a corresponding color.

* * * * *